United States Patent [19]

Iltgen

[11] Patent Number: 5,543,159
[45] Date of Patent: Aug. 6, 1996

[54] FLASH-PROOF RIM MOLD AND METHOD OF MAKING

[75] Inventor: Joerg Iltgen, Ajax, Canada

[73] Assignee: General Motors of Canada Limited, Oshawa, Canada

[21] Appl. No.: 306,296

[22] Filed: Sep. 15, 1994

[51] Int. Cl.⁶ ................................................. B29C 45/17
[52] U.S. Cl. ..................... 425/543; 264/219; 249/114.1; 425/DIG. 47
[58] Field of Search ................................. 264/219, 328.9; 249/114.1, 115, 160; 425/543, 806, DIG. 47

[56] References Cited

U.S. PATENT DOCUMENTS

| 3,273,205 | 9/1966 | Hanley | 425/806 |
| 3,566,447 | 3/1971 | Ogden | 264/219 |

FOREIGN PATENT DOCUMENTS

| 58-205740 | 11/1983 | Japan | 425/DIG. 47 |
| 61-74810 | 4/1986 | Japan | 425/DIG. 47 |
| 62-174214 | 7/1987 | Japan | 264/219 |
| 6-114888 | 4/1994 | Japan | 264/219 |

*Primary Examiner*—Robert Davis
*Attorney, Agent, or Firm*—Lawrence B. Plant

[57] ABSTRACT

A flash-proof RIM mold and method of making same. The mold has a thermosetting resin squeezed and cured between the mold portions at the edge of the parting line exposed to the mold cavity. The resin fills any gaps between the mold portions resulting from mismatched surfaces. The resin adheres to one mold portion and is readily spaceable from the other. A strip of uncured resin is applied to one of the mold portions, the mold closed at its operating temperature, and the resin allowed to cure to a semi-cured state. The mold is opened and any resin exuding into the mold cavity removed. After the resin has fully cured the mold is ready for use.

12 Claims, 2 Drawing Sheets

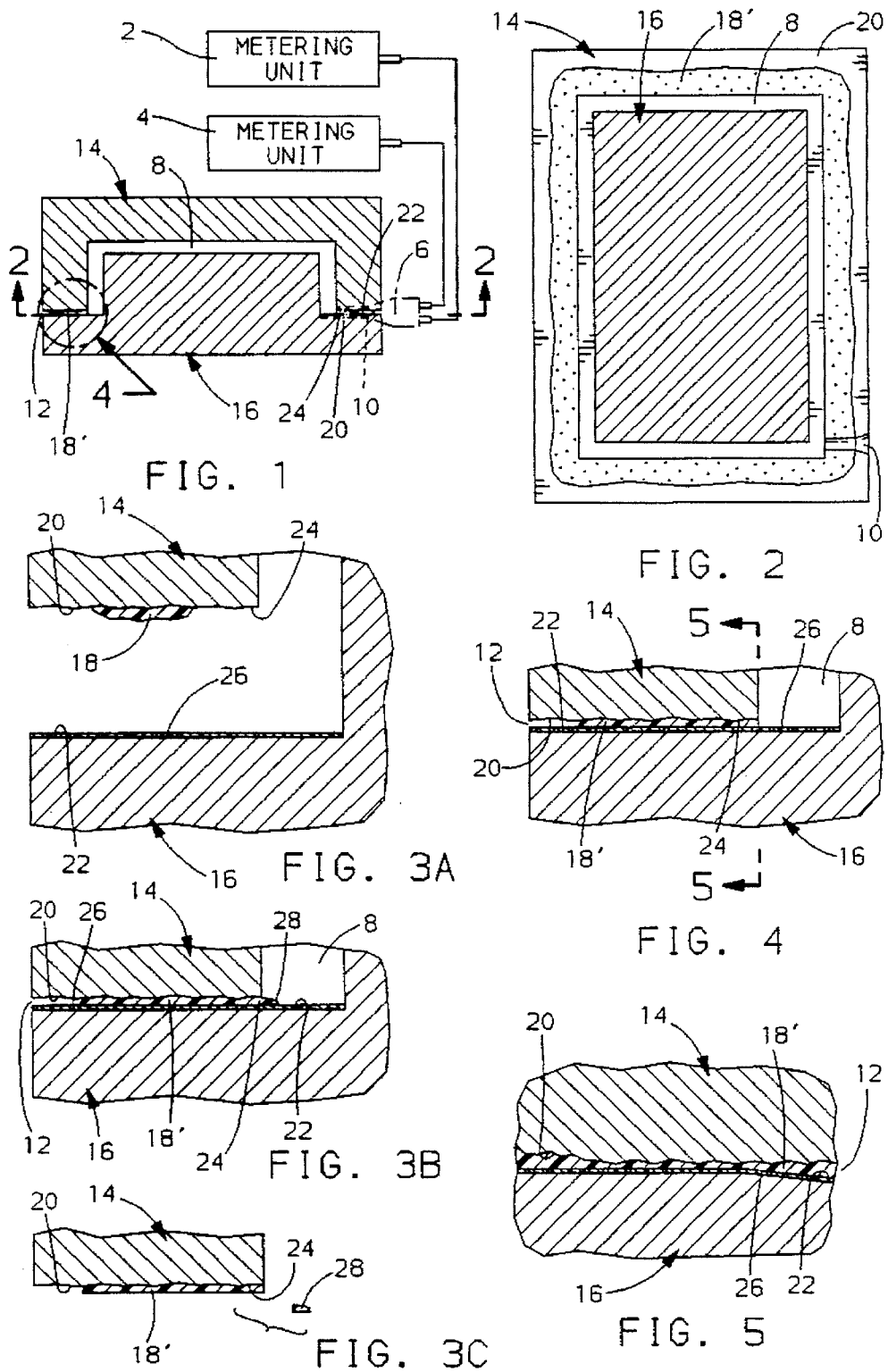

FLASH-PROOF RIM MOLD AND METHOD OF MAKING

This invention relates to a reaction-injection-molding (RIM) mold capable of producing moldings having little or no flash formed at the parting line between the mold segments.

BACKGROUND OF THE INVENTION

Reaction-injection-molding (RIM) is a well-known process for molding polymeric parts. In the RIM process, low molecular weight, reactive, low viscosity liquids are injected at a high pressure into a small mixing chamber and thence into a mold cavity. The liquid reactants polymerize in the mold to form the molded article. The RIM process is useful with a variety of polymer systems, but is most commonly used to form polyurethanes by the reaction between polyols and isocyanates. The reactants or prepolymers (i.e., polyol and isocyanate) are stored separately, and via appropriate high pressure pump metering units, are delivered as liquids at pressures between about 1500–3000 psi to a mixing head adjacent the mold. At the mixing head, the two liquids impinge and are thoroughly mixed before being injected into the mold cavity. Once in the mold cavity, the polymerization reaction completes itself and the finished article is formed. For polyurethanes, the pressure in the mold itself reaches about 100 to about 250 psi.

RIM molds, like many molds, comprise at least two segments which, in a mold-closed position, come together to define a mold cavity therebetween and into which the reactants are injected. In a mold-open position, the mold permits removal or ejection of the molded article from the mold cavity. The mold segments each have a face thereon confronting the other mold segment. The faces have complementary shapes and come together, in a mold-closed position, along a surface known as a parting line. One edge of the parting line is exposed to the mold cavity. In the course of making the mold, the mating faces of the mold segments are "spotted in" at the mold's operating temperature which involves finishing the complimentary faces such that there is a mating fit therebetween. Unfortunately, the "spotting in" process is not perfect, especially when forming molds have complex shaped mating faces. As a result, there is usually some degree of mismatch between the faces. This mismatching of the mold segments in turn results in the formation of small gaps between the mating faces at the parting line, and particularly at the edge of the parting line which is exposed to the mold cavity. When such gaps occur at the edge of the parting line, the liquid mixture injected into the mold cavity can invade the parting line at its edge and produce protrusions, known as "flash", on the finished article which must then be removed in a separate operation.

It is an object of the present invention to provide a substantially flash-proof reaction-injection-molding mold and process for making same.

This and other objects and advantages of the present invention will become more readily apparent from the following detailed description thereof.

BRIEF DESCRIPTION OF THE INVENTION

According to one aspect thereof, the present invention contemplates a flash-proof RIM mold having first and second mating mold segments which, in a mold-closed position, define a molding cavity therebetween. The first and second segments each have substantially complimentary-shaped faces which are "spotted in" so as to mate, as much as possible, with one another at a parting line between the segments. The parting line has an edge thereof exposed to the molding cavity, and an interlayer film of thermosetting resin between the mating faces contiguous the edge which fills any small gaps therebetween so as to prevent intrusion of the parting line by any liquid reactants injected into the cavity. The thermosetting resin adheres firmly to the face of one of the mold segments, and is readily separable from the other of the faces such that the resin film will adhere to, and remain with, the one mold segment without being pulled away therefrom when the mold is opened. Preferably, the face of the mold segment to which the resin film adheres is roughened to provide a multiplicity of anchoring sites for the film.

According to another aspect thereof, the present invention contemplates a method of making a flash-proof mold of the aforesaid type wherein a surface on the face of one of the mold segments, contiguous the edge of the parting line, is prepared to securely anchor a film of thermosetting resin applied thereto. This preparation will preferably comprise roughening the surface of the face to provide a plethora of anchoring sites thereon, but alternatively may involve the use of appropriate bonding agents, adhesives, or the like. Roughening may be effected by mechanical (e.g., abrading) or chemical (e.g., etching) techniques well known in the art. A second surface on a face of the second mold segment which confronts the first surface on the first mold segment is prepared to resist sticking or adhesion of the resin film to such surface. Such anti-sticking preparation comprises polishing of the surface and preferably the use of a release agent applied thereto. After the mating surfaces have been appropriately prepared, the mold segments are heated to about the normal operating temperature of the mold. In the case of RIM molds for polyurethanes, this temperature will typically be about 150°–170° F. While the mold segments are at the mold operating temperature, a strip or bead of thermosetting resin (i.e., about 0.015 to about 0.500 inches wide) is applied to one of the mold surfaces (preferably the roughened surface) adjacent the edge, and before any significant curing can occur, the mold is closed so as to mate the mold segments one to the other and cause the resin to flow between the opposing surfaces and fill any gaps therebetween along the edge of the parting line. As the mold closes, some of the resin film exudes out from between the faces of the mold portion into the mold cavity. The mold is kept closed until the resin is in a semi-cured state so as to be stiff and sufficiently hardened that it will retain any contours formed therein by the closed mold after the mold is opened. In the semi-cured state, the exudate projecting into the mold cavity is still sufficiently soft that it can be readily cut or otherwise trimmed away from the resin adhering to the face of the mold segment. The resin is then allowed to fully cure before using the mold to mold the desired articles. Heating the mold segment to the operating temperature before curing the resin insures that all expansion of the mold segments has occurred and that the resin initially cures when any mismatch between the mold segments is at its worst. In an alternative embodiment, a thermosetting resin having a curing temperature near that of the operating temperature of the mold may be spread on the selected surface of the mold segment prior to heating the mold up to its operating temperature at which time the reaction is triggered and curing commences. Importantly, the resin used, and the time of its application to the mold, must be such that the resin will not significantly cure before the mold is closed.

While the present invention has been demonstrated effectively with a variety of metal or ceramic particulate filled epoxy resins, other resin systems such as certain silicones, polyesters, polyurethanes and the like are also believed to be potentially useful. The only requirement for the resin is that after curing it is sufficiently hard and durable to prevent intrusion of the reactants over a period of repeated use of the mold. One potentially useful such polyester systems is identified as Akemi with Filler 7 (Tool Chemical Co.). Other useful and potentially useful epoxy resins include (1) ARALDITE av8531/hv8531 (Ciba Geigy Co.), (2) ARALDITE 8113/hv8113 (Ciba), (3) ARALDITE 8503/hv8502 (Ciba), (4) ARALDITE 8535/hv8535 (Ciba), (5) ARALDITE V138/hv998, (6) EL-315 Series (AD-TECH Plastic Systems Corp.), (7) ESR-217-AL (AD-TECH Plastic Systems Corp.), (8) TCC-606 (Tool Chemical Co., Inc.), (9) Super Metal 1111 (Belzona Inc.) and (10) Super XL Metal (Belzona Inc.) are considered to be acceptable. A silicon-steel filled epoxy identified as 1321 Ceramic S Metal sold by Belzona Inc. is the preferred thermosetting resin. A variety of release agents selected from the soap or wax families are useful, I have had particular success with a paraffin-based release agent, identified as Belzona 9411. These resin and release agent materials have been found to be particularly effective for use with metal RIM molds used to mold polyurethanes from reactants including polyol, isocyanate, IMR, a chain extender and a catalyst to which a suitable filler (e.g., mica or wollastonite) has been added. Such reactants are commercially available from a number of sources including such companies as The Dow Chemical Co., and Miles, Inc.

The release agent should be extremely thin and preferably takes the form of either a sprayed-on or brushed-on film. The epoxy layer, on the other hand, is heavier, and may be applied either with a brush or a syringe which applies a bead thereof along the edge of the parting line. Closing the mold causes the bead to flow laterally into any small gaps between the mold portions as well as into the mold cavity itself.

After the resin has fully cured, it is capable of resisting the intrusion of the liquid reactants into the parting line via the edge thereof exposed to the mold cavity.

DETAILED DESCRIPTION OF SPECIFIC EMBODIMENTS OF THE INVENTION

The invention will better be understood when considered in the light of the following detailed description thereof which is given hereafter in conjunction with the several figures in which:

FIG. 1 illustrates a RIM molding arrangement including the mold seal according to the present invention.

FIG. 2 is a view in the direction 2—2 of FIG. 1.

FIGS. 3A–3C illustrate the major steps of the process of the present invention.

FIG. 4 is an enlargement of a portion of the mold shown in FIG. 1.

FIG. 5 is a magnified view in the direction 5—5 of FIG. 4.

Figure 6A:
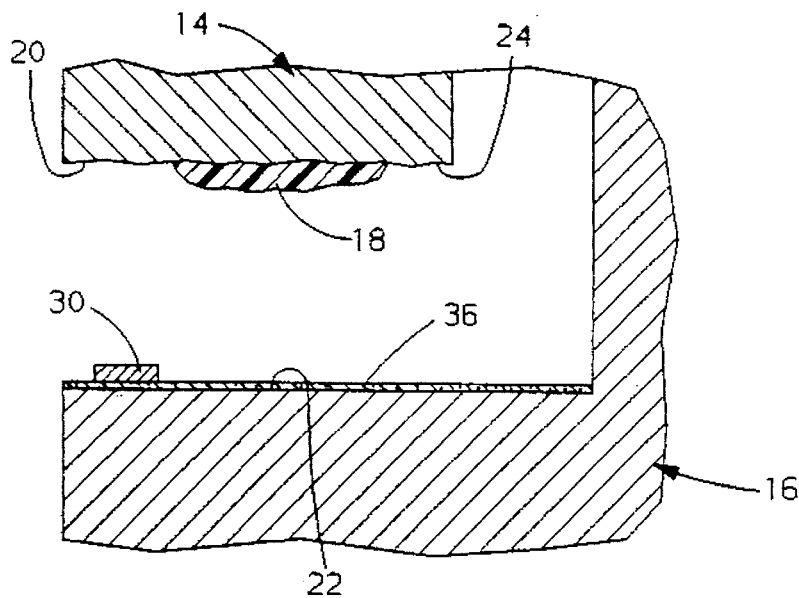
FIG. 6A–6D illustrate another embodiment of the invention.

FIG. 1 illustrates a reaction-injection-molding system including metering units 2 and 4 for delivering reactants (e.g., polyol and isocyanate) under pressures of about 1500 to about 3000 psi to a mixing head 6 where the reactants are mixed by impingement just prior to flowing into a mold cavity 8 via gate 10 located at the parting line 12 between upper mold portion 14 and lower mold portion 16. The mixed reactants are injected into the mold cavity 8, and therein complete their reaction (i.e., cure) to form the finished article. The pressure in the mold typically builds to any where between about 100 psi to about 250 psi depending on the amount of material injected and the gas content thereof. A ribbon of thermosetting resin 18' lies between the face 20 of the mold portion 14 and the face 22 of the mold portion 16 at and inboard the edge 24 of the parting line 12 to prevent intrusion of the reactants into the parting line between the mold segments. FIG. 2 is a view in the direction 2—2 of FIG. 1 and shows the ribbon of resin 18 spread out along the parting line inboard the edge 24 thereof after having been squeezed by the closing of the mold prior to the curing of the resin.

FIGS. 3A, 3B and 3C illustrate essentially the process for forming the sealing ribbon 18 on the face 20 of the mold portion 14. Following "spotting in" of the mold faces 20 and 22 in the normal manner, the face 20 is roughened to promote adhesion of the resin 18 to the face 20. Roughening is conveniently achieved by mechanically abrading the surface with a 180 grit, or less, abrasive material, but may also be accomplished by chemically etching or other means for providing a multitude of anchoring sites thereon for holding the resin 18 thereto once cured. Suitable adhesives may also be used if desired. The essential requirement is that, once cured, the resin 18 will adhere to the face 20 of the mold portion 14 throughout repeated usage of the mold. The strip of resin 18 may be applied by brush or with a syringe or the like having an appropriate dispensing nozzle. The mating face 22 on the mold portion 16 opposite the face 20 of the mold portion 14 is prepared so as to prevent the resin 18 from adhering or sticking thereto. The surface 22 will preferably be polished to provide a smooth surface which is then coated with a film 26 of an appropriate release agent such as a wax or soap-based material. A preferred such agent is a paraffin-based release agent sold under the trade designation Belzona 9411. Preferably, the mold is heated to about its normal operating temperature (e.g., about 160° F.) before the strip of resin 18 is applied thereto, and after such application is immediately closed. As illustrated in FIG. 3B, closing of the mold portions 14 and 16 spreads the strip 18 throughout the interface therebetween adjacent the edge 24 of the parting line 12 to form the ribbon 18' as a result of the compression of the strip 18 and its exuding both inwardly of the parting line 12 and outwardly into the mold cavity 8 to form the lip of exudate 28. The mold is kept closed for a sufficient time (e.g., about 45 minutes) that the resin 18' becomes semi-cured sufficiently to adhere to the surface 20 and retain any contours or topographic features formed therein incident to the closing of the mold and spreading out of the resin 18' between the faces 20 and 22 of the mold portions 14 and 16 respectively. However, curing will not be so complete as to impede the subsequent ready trimming-off of the lip of exudate 28 invading the mold cavity 8 as illustrated in FIG. 3C following opening of the mold. After opening and trimming-off of the lip 28, the mold is kept opened and retained at its operating temperature until the resin becomes completely cured and hard.

Following complete curing of the resin 18', the mold can be repeatedly opened and closed (e.g., see FIG. 4) with the ribbon of resin 18 adhering to the mold portion 14, but readily separable from the mold portion 16. Preferably (through not necessarily), a release agent 26 will be used on the smooth face 22 each time the mold is cycled to insure that the cured resin 18' does not stick thereto and pull away from the surface 20 of the mold portion 14.

FIG. 5 is a view in the direction 4—4 of FIG. 4 and illustrates one example of how the resin 18' might reshape itself to conform to any irregularities or gaps 27 that might exist at the edge 24 of the parting line 12.

Figure 6B:
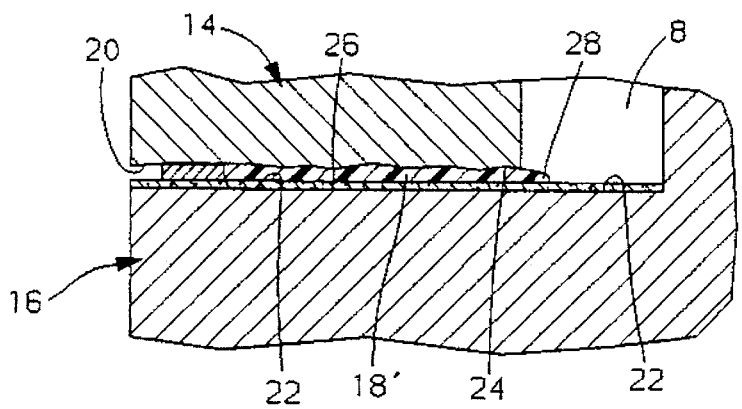
Figure 6C:
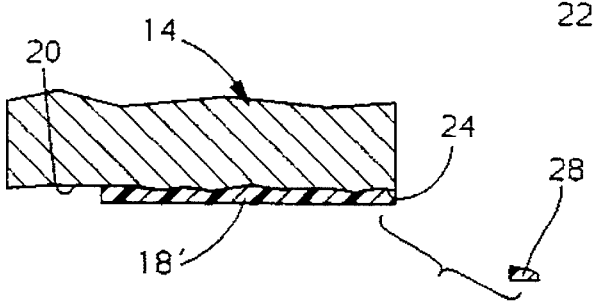
Figure 6D:
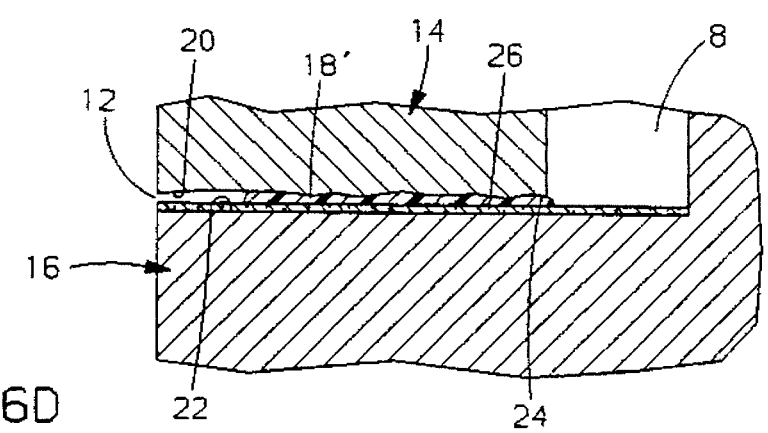

FIGS. 6A–6D illustrate a variation on the process of the present invention which is particularly useful with resins which are resilient at the mold closing pressures. According to this embodiment, a shim 30 having a thickness between about 0.001 inch to about 0.010 inch is positioned between the mold portions 14 and 16 and serves as a "stop" during the closing of the mold to fix the thickness of the resin 18 during curing thereof. When the mold is opened and the lip of exudate 28 removed, the shim 30 is also removed from between the mold halves. When the mold is in use, the resilient resin 18' is compressed to a thickness less than the thickness of the shim and the pliant resin 18' conforms to the contours of the surfaces defining the parting line. For example, a band of resin 18' cured to a thickness of 0.005 inches using a 0.005 inch thick shim (see FIG. 6B), is compressed to about 0.003 inch thick in actual operation during a typical molding cycle (see FIG. 6D.

EXAMPLE

A steel mold having a configuration essentially like that shown in FIG. 1 has the face 20 of the mold portion 14 abraded using a 180 grit sandpaper. The opposing face 22 on the mold portion 16 is polished to a smooth surface and has a thin film (i.e., less than about 0.002 inches thick) of Belzona 9411 release agent applied thereto. A bead 0.125 inches wide and 0.125 inches high of Belzona 1321 Ceramic S Metal epoxy is applied to the face 20 along the parting line between the faces 20 and 22 adjacent the edge 24 after the mold has been heated to a temperature of 160° F. Immediately thereafter, the mold is closed and the strip 18 compressed to form a ribbon 18' thereof having a width of about 0.375 inches and a thickness conforming to any irregularities or gaps between the faces 20 and 22 at the parting line 12 therebetween adjacent the edge 24. From mold-to-mold, these dimensions will vary depending on the amount of resin used and the size of the gaps being filled. The mold is left closed for approximately 45 minutes at this temperature until the epoxy was cured to stiff but not fully cured, state such that the epoxy is still readily trimmable yet sufficiently firm as to retain any contours formed therein by being squeezed between the faces 20 and 22 when the mold is closed. Any epoxy that exudes out from between the faces 20 and 22 into the mold cavity 8 is trimmed along the edge 24 of the parting line 2 using a utility knife or the like. Thereafter, the epoxy ribbon 18' is allowed to cure to full hardness. The mold so made is useful to mold as many as about 5000 polyurethane articles before any repairs need be made to the seal.

While the invention has been disclosed primarily in terms of a specific embodiment thereof it is not intended to be limited thereto but rather only to the extent set forth hereafter in the claims which follow.

The embodiments of the invention in which an exclusive property or privilege is claimed are defined as follows:

1. In a metal, reaction-injection-molding mold comprising first and second mating segments which, in a mold-closed position, define a cavity therebetween for receiving a liquid mixture of reactants and said first and second segments each have complimentary shaped faces which mate one with the other at a parting line having an edge exposed to said cavity, the improvement comprising an interlayer of thermosetting resin between said faces contiguous said edge and filling any gaps between said faces at said:edge so as to prevent intrusion of said parting line by said reactants and the coincident formation of flash on articles formed in said cavity, wherein said resin (a) adheres firmly to one of said faces, (b) is readily separable from the other of said faces and (c) is cured in situ between said faces when said mold is in said mold-closed position so as to provide an exposed surface thereon in the mold-open position which conforms to the topography of said other of said faces.

2. The mold according to claim 1 wherein said resin comprises an epoxy resin.

3. The mold according to claim 2 wherein said epoxy contains a particulate filler selected from the group consisting of ceramics and metals.

4. A method of making a substantially flash-proof metal, reaction-injection-molding mold comprising first and second mating portions defining a molding cavity for receiving a liquid mixture of reactants, said first and second portions each having complimentary shaped faces which mate one with the other at a parting line having an edge exposed to said cavity, comprising the steps of:

preparing a first surface of one of said faces adjacent said edge to receive and adherently retain a film of thermosetting resin applied thereto;

preparing a second surface of the other of said faces adjacent said edge to prevent adherence of said thermosetting resin thereto;

heating the mold portions to a temperature near the temperature at which said mold normally operates;

applying a strip of thermosetting resin to one of said surfaces;

closing said mold so as to mate said portions one to the other, and cause said resin to flow and distribute itself between said surfaces so as to fill any gaps therebetween;

while said mold is closed, curing said resin to a semi-cured state which is sufficiently hard that the resin will retain any contours formed therein by the closed mold;

opening said mold such that said resin adheres to said first surface and separates from said second surface;

trimming off any semi-cured resin that might have exuded from said edge into said cavity; and allowing said resin to completely cure;

whereby a mold is formed having a parting line which resists intrusion by said liquid reactants at said edge.

5. A method according to claim 4 wherein said thermosetting resin is an epoxy.

6. A method according to claim 4 wherein said preparing includes roughening said first surface to provide a plurality of sites for anchoring said resin to said surface.

7. A method according to claim 4 including the step of coating said second surface with a release agent.

8. A method according to claim 7 wherein said release agent is selected from the group consisting of soap and wax.

9. A method according to claim 4 wherein said resin has a curing temperature near said operating temperature and said resin is applied to said surface before said mold portions are heated to said operating temperature.

10. A method according to claim 4 wherein said resin is applied to said surface after said mold portion has been heated to said operating temperature and just before said mold is closed.

11. A method according to claim 4 wherein said strip varies in width from about 0.015 inches to about 0.500 inches.

12. The mold according to claim 1 wherein said resin is selected from the group consisting of epoxies, silicones, polyesters and polyurethanes.

* * * * *